United States Patent
Townsend, Jr. et al.

(10) Patent No.: US 6,991,340 B2
(45) Date of Patent: Jan. 31, 2006

(54) INDIRECT VIEWING DEVICE

(75) Inventors: Ray Theodore Townsend, Jr., 13031 Oak Brook Dr., Des Moines, IA (US) 50323; Liansuo Xie, Ankeny, IA (US)

(73) Assignee: Ray Theodore Townsend, Jr., Des Moines, IA (US)

( * ) Notice: Subject to any disclaimer, the term of this patent is extended or adjusted under 35 U.S.C. 154(b) by 0 days.

(21) Appl. No.: 10/843,880

(22) Filed: May 12, 2004

(65) Prior Publication Data

US 2005/0254151 A1    Nov. 17, 2005

(51) Int. Cl.
G02B 7/182    (2006.01)
G02B 7/198    (2006.01)
F21V 33/00    (2006.01)
A45D 42/00    (2006.01)

(52) U.S. Cl. .................. 359/860; 359/857; 359/861; 359/881; 362/135; 362/142

(58) Field of Classification Search ............... 359/402, 359/403, 404, 405, 406, 860, 861, 862, 879, 359/880, 881, 882, 471, 857, 863, 865; 362/128, 362/129, 135, 138, 139, 140, 141, 142, 144
See application file for complete search history.

(56) References Cited

U.S. PATENT DOCUMENTS

| | | | | |
|---|---|---|---|---|
| 710,237 | A | * | 9/1902 | Barnard ...................... 359/471 |
| 918,752 | A | * | 4/1909 | König ........................ 359/404 |
| 1,440,231 | A | * | 12/1922 | Miller ........................ 359/471 |
| 1,745,862 | A | * | 2/1930 | O'Rourke ................... 359/861 |
| 2,193,217 | A | * | 3/1940 | Allen ......................... 359/862 |
| 2,276,776 | A | * | 3/1942 | Hofmann .................... 40/715 |
| 2,522,938 | A | * | 9/1950 | Francis ....................... 359/862 |
| 2,523,975 | A | * | 9/1950 | Thomas ...................... 359/482 |
| 2,619,008 | A | * | 11/1952 | Fuentes ...................... 359/856 |
| 2,625,853 | A | * | 1/1953 | Roger ........................ 359/401 |
| 2,625,854 | A | * | 1/1953 | Hayward .................... 359/401 |
| 2,909,959 | A | * | 10/1959 | Girden ........................ 2/427 |
| 3,803,737 | A | * | 4/1974 | Beckett ....................... 40/367 |
| 4,119,107 | A | * | 10/1978 | Pinzone et al. ............. 132/316 |
| 4,196,966 | A | * | 4/1980 | Malis ......................... 359/482 |
| 4,268,121 | A | | 5/1981 | Peskin |
| 5,537,160 | A | | 7/1996 | King |
| 5,638,144 | A | | 6/1997 | Vakavtchiev |
| 6,007,198 | A | | 12/1999 | Burton |
| 6,065,832 | A | | 5/2000 | Fuziak |
| 6,122,100 | A | * | 9/2000 | Miller ........................ 359/402 |
| 6,270,226 | B1 | | 8/2001 | Taylor |
| 6,293,681 | B1 | | 9/2001 | Frank |
| 6,322,222 | B1 | | 11/2001 | Kobayashi |
| 6,357,882 | B1 | | 3/2002 | Whittingdale |
| 6,400,503 | B1 | * | 6/2002 | Mickelson .................. 359/405 |
| 6,733,150 | B1 | * | 5/2004 | Hanley ....................... 362/106 |

FOREIGN PATENT DOCUMENTS

FR          793260    *    1/1936    ................. 359/402

* cited by examiner

Primary Examiner—John Juba, Jr.

(57) ABSTRACT

A device for reflecting an image to a user's eyes that includes a viewing member having an interior mirror positioned in angled alignment with the user's eye; and an exterior mirror positioned in spaced alignment to the interior mirror. The exterior mirror is adjustable with respect to the interior mirror. The device further includes a pair of interior mirrors positioned in angled alignment to the user's eyes; and a pair of exterior mirrors in spaced alignment to the interior mirrors.

17 Claims, 2 Drawing Sheets

INDIRECT VIEWING DEVICE

BACKGROUND OF THE INVENTION

The present invention relates to an indirect viewing device. More particularly, the indirect viewing device provides a field of view behind, in front, below, above, and to either side of the user when an individual is looking directly ahead. Additionally, when the present invention is used in conjunction with a flat mirror on the back, the user can view his back without distorting the body or head.

Indirect viewing devices are generally known. Commonly, they are provided as rearview mirrors on vehicles or on head gear worn by vehicle operators. Likewise, it is known to provide multi-mirrored indirect viewing devices such as periscopes for indirectly viewing an object. These prior art devices are often inadequate because they do not provide true images; they do not allow the user to look directly ahead to view the image displayed by the device; and/or they are not adjustable to provide a field of view behind, in front, below, above, and to either side of the user.

Therefore, it is an object of the present invention to provide an indirect viewing device that presents a true image.

A further object of the present invention is to provide an indirect viewing device that allows the user to get a true image of oneself from the rear when another mirror is positioned behind the user.

Another object of the present invention is to provide an indirect viewing device that allows the user to look directly ahead by presenting the image in the viewer's direct line of sight.

A still further object of the present invention is to provide an indirect viewing device that provides multiple mirrors used to reflect a single image, where the mirrors move with respect to one another.

These and other objects will be apparent to those skilled in the art.

SUMMARY OF THE INVENTION

A device for reflecting an image to a user's eyes includes a viewing member having an interior mirror positioned in angled alignment with the user's eye; and an exterior mirror positioned in spaced alignment to the interior mirror. The exterior mirror is adjustable with respect to the interior mirror.

DETAILED DESCRIPTION OF THE PREFERRED EMBODIMENT

Figure 1:
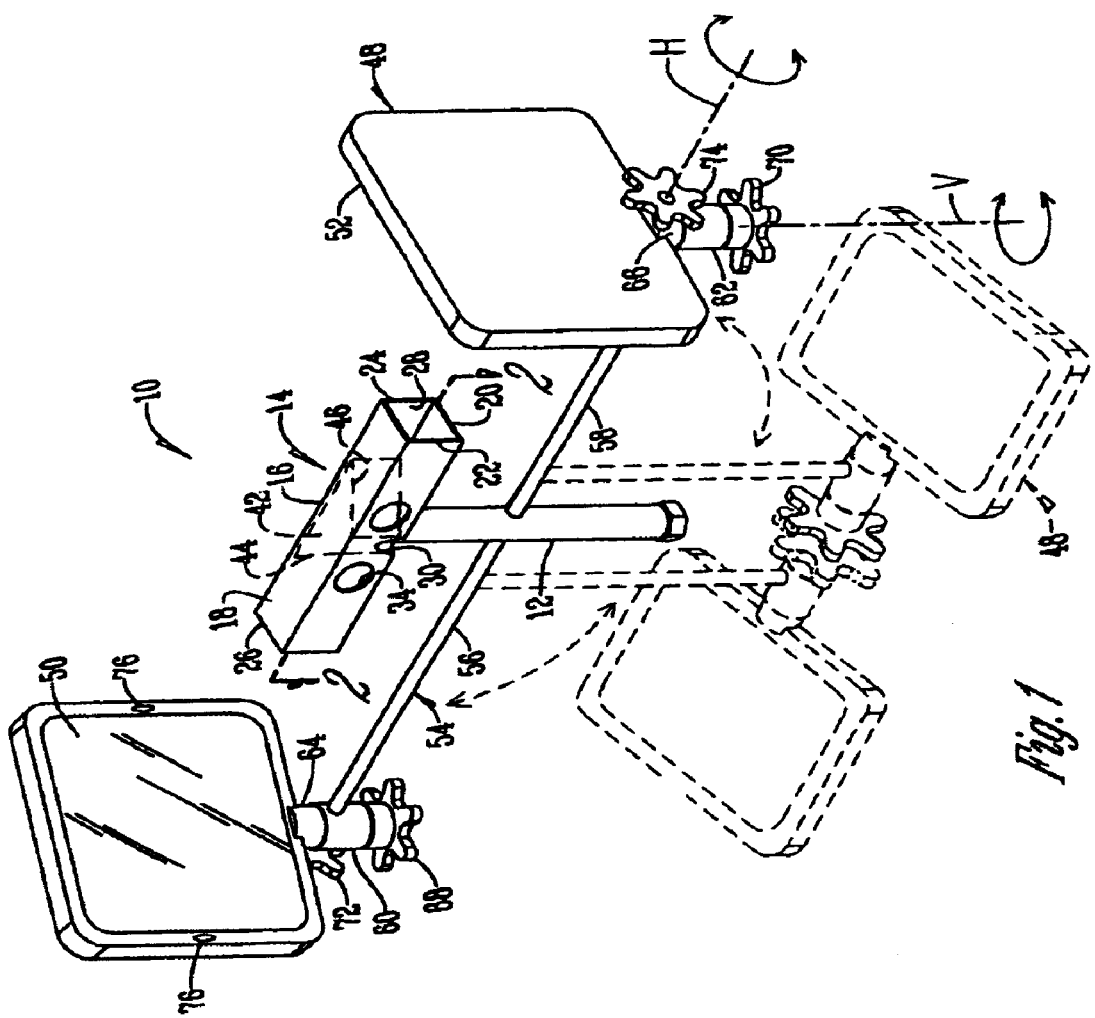
FIG. 1 is a perspective view of an indirect viewing device.
Figure 2:
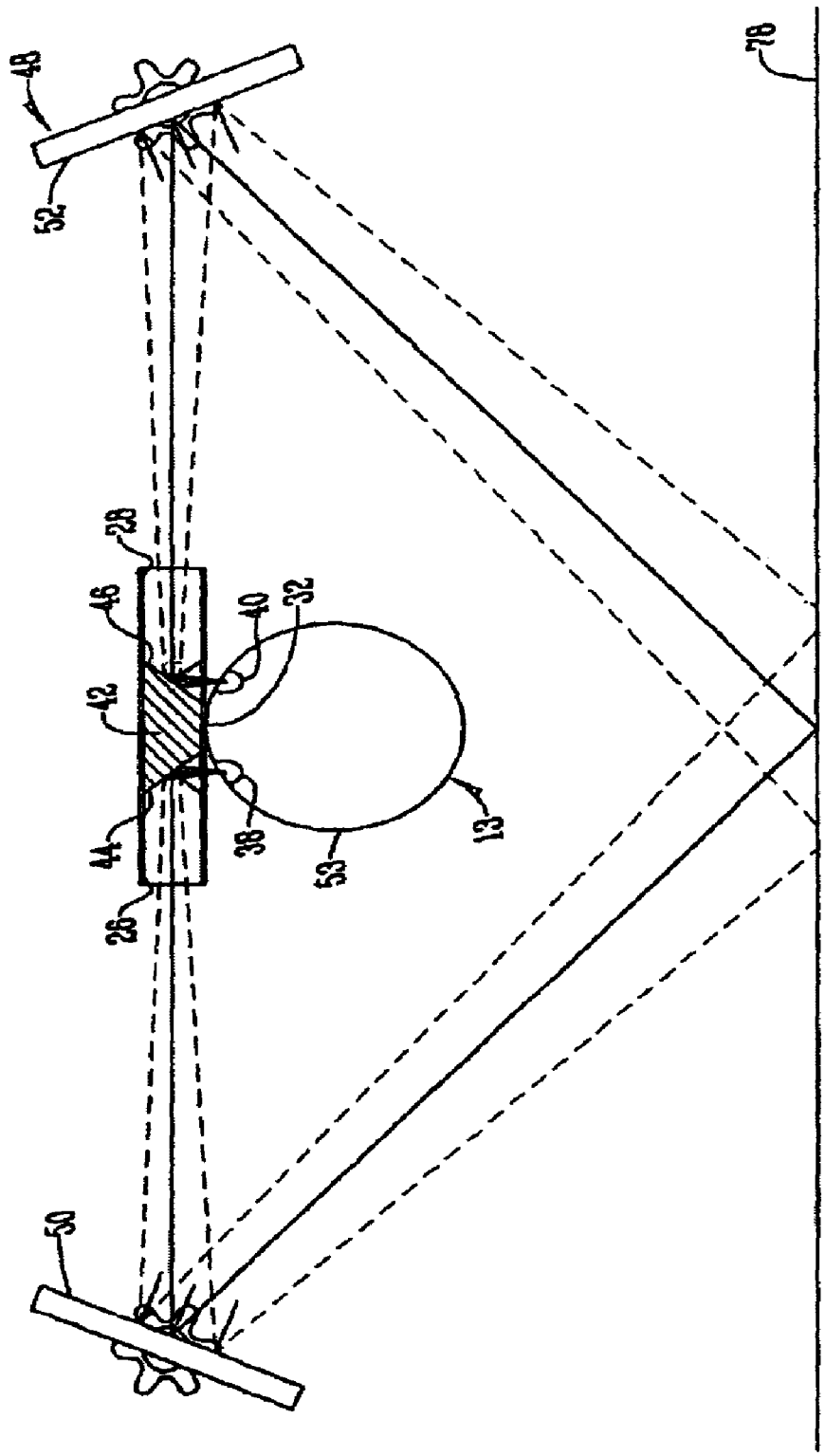
FIG. 2 is a top plan view of an indirect viewing device.

With reference to FIGS. 1 and 2, an indirect viewing device 10 includes a central support 12. As shown, central support 12 has a vertically oriented extended cylindrical structure, and operates to provide a user 13 with a handle for supporting the indirect viewing device 10. Alternatively, the central support 12 operates to mount the indirect viewing device 10 to another structure (not shown).

A viewing member 14 is attached to an upper end of the central support 12, and extends laterally to the left and right from the central support 12. Viewing member 14 has a main body 16 including a top 18, bottom 20, and vertical sides 22 and 24 extending from the top 18 to the bottom 20. The top 18, bottom 20, and sides 22 and 24 form open ends 26 and 28 at the left and right sides of main body 16, respectively.

A nose recess 30 is formed in the vertical side 22 of viewing member 14 and is shaped to receive a nose 32 of a user 13. Likewise, left and right eye apertures 34 and 36 are formed in the vertical side 22, one on each side of nose recess 30. The eye apertures 34 and 36 permit the left and right eyes 38 and 40, respectively, of a user 13 to see within viewing member 14.

A block member 42 is contained within the viewing member 14. Block member 42 and main body 16 may be formed of any suitable material including, but not limited to molded plastic, aluminum, pressed cardboard or the like. The block member 42 supports left and right interior mirrors 44 and 46, respectively, within the viewing member 14. The interior mirrors 44 and 46 are located within the viewing member 14 adjacent the eye apertures 34 and 36 to reflect images entering viewing member 14 from open ends 26 and 28 to a user's eyes 38 and 40 through eye apertures 34 and 36, respectively. The interior mirrors 44 and 46 are oriented at about 90° relative to each other and about 45° from the eyes 38 and 40, respectively; however, other angles may be used without departing from the scope of the present invention.

A reflecting member 48 is positioned on either side of viewing member 14. Reflecting member 48 includes exterior mirrors 50 and 52 positioned in spaced alignment to the left and right of the interior mirrors 44 and 46, respectively. The exterior mirrors 50 and 52 are arranged to reflect an image from the exterior mirrors 50 and 52 to the interior mirrors 44 and 46, and then to the eyes 38 and 40, respectively.

Exterior mirrors 50 and 52 are optionally flat, concave, or convex, depending on the reflective properties desired. Exterior mirrors 50 and 52 are positioned laterally beyond the width of a user's head 53, so that the user's own head 53 is not a visual impediment for the indirect viewing device 10. The exterior mirrors 50 and 52 are rotatable about a vertical axis V and/or a horizontal axis H, while the interior mirrors 44 and 46 remain in a fixed angled alignment to the user's eyes 38 and 40, respectively.

The reflecting member 48 is mounted to adjustment member 54 which is connected to the central support 12. Adjustment member 54 holds reflecting member 48 in spaced alignment to viewing member 14, and allows reflecting member 48 to tilt with respect to viewing member 14.

Adjustment member 54 includes left and right support arms 56 and 58 that extend laterally from either side of central support 12 parallel to viewing member 14. Support arms 56 and 58 are optionally hingedly connected to central support 12. This hinged connection between support arms 56 and 58 and central support 12 allow support arms 56 and 58 to be folded down to conserve space for storage or transport. Support arms 56 and 58 terminate in vertically oriented sleeves 60 and 62 that slidably receive vertical posts 64 and 66.

Vertical posts 64 and 66 extend from the bottom edge of exterior mirrors 50 and 52, through sleeves 60 and 62, and terminate in knobs 68 and 70, respectively. The vertical posts 64 and 66 are rotatably received within sleeves 60 and 62, respectively. Where a user wishes to tilt reflecting member 48 along vertical axes V, V' one or both of knobs 68 and 70 are grasped and turned to rotate posts 64 and 66 within sleeves 60 and 62, necessarily also moving the associated exterior mirrors 50 and 52 about the vertical axes V, V'.

Additionally, horizontal knobs 72 and 74 may optionally be provided to allow a user to rotate exterior mirrors 50 and 52 about horizontal axis H. A similar (or different) structure may be provided within adjustment member 54 for permitting such rotation about the horizontal axis H. For example, support arms 56 and 58 may themselves rotate with respect to central support 12 to allow exterior mirrors 50 and 52 to tilt with respect to viewing member 14.

To improve viewing conditions, lights 76 are optionally provided adjacent exterior mirrors 50 and 52 to increase the intensity of the image reflected by exterior mirrors 50 and 52. Lights 76 may be any known light source, including light bulbs, LEDs, or the like.

In use, a user 13 holds or mounts the central support 12 of the indirect viewing device 10. While looking through apertures 34 and 36, the user rotates exterior mirrors 50 and 52 to a desired position such that an image is reflected from the exterior mirrors 50 and 52 through the view member 14 to the interior mirrors 44 and 46, and then through apertures 34 and 36 to a user's 13 eyes 38 and 40. By adjusting the exterior mirrors 50 and 52 about horizontal axis H and vertical axis V, user 13 can see an image in front, behind, to the side, above, and below, while looking directly ahead. Also, by positioning a rear mirror 78 behind the user 13, and positioning the outside mirrors 50 and 52 to focus on mirror 78, one can see a true image of themselves from the rear while looking ahead.

It is therefore seen that this invention will accomplish at least all of its stated objectives.

What is claimed is:

1. A device for reflecting an image to a user's eyes to indirectly view objects comprising:
   a viewing member having a pair of interior mirrors positioned in angled alignment with the user's eyes;
   a pair of exterior mirrors positioned in spaced alignment to the interior mirrors;
   wherein the viewing member has a main body with open ends where the interior mirrors are located within the main body and the exterior mirrors are located outside the main body; and
   wherein lights are provided adjacent the exterior mirrors to increase the intensity of an image reflected by the exterior mirrors.

2. The device of claim 1, wherein the interior mirror is angled at about 45° relative to the user's eye.

3. The device of claim 1, wherein the viewing member adjacent the interior mirrors is attached to a central support, the viewing member having an eye aperture formed in the main body of the viewing member adjacent the interior mirror, and a recess formed to receive a nose of a user.

4. The device of claim 1, wherein the exterior mirrors are adjustable with respect to the interior mirrors.

5. The device of claim 4, wherein the exterior mirrors are mounted to adjustment members, the adjustment members include support arms that extend laterally from central supports.

6. The device of claim 5, wherein the adjustment members terminate in vertically oriented sleeves, and wherein vertical posts extend from bottom edges of the exterior mirrors and are rotatably received within the sleeves.

7. The device of claim 5, wherein support arms are hingedly connected to the central supports to allow the support arms to be folded down.

8. The device of claim 1 wherein the exterior mirrors have surfaces selected from a group consisting of flat, concave, and convex.

9. The device of claim 1, further comprising a rear mirror positioned in spaced alignment to the exterior mirrors behind the user, wherein the exterior mirrors are oriented and arranged to reflect images of the user's rear from the rear mirror while the user is looking ahead into the viewing member.

10. A device for reflecting an image to a user's eyes to indirectly view objects comprising:
    a pair of interior mirrors positioned in angled alignment to the user's eyes;
    a pair of exterior mirrors in spaced alignment to the interior mirrors; and
    a rear mirror positioned in spaced alignment to the exterior mirrors behind the user, wherein the exterior mirrors are oriented and arranged to reflect an image of the user's rear from the rear mirror while the user is looking ahead into the device.

11. The device of claim 10, wherein the pair of exterior mirrors are adjustable with respect to the pair of interior mirrors.

12. The device of claim 10, further comprising a pair of apertures in a viewing member, the pair of apertures in alignment with the pair of interior mirrors.

13. A device for reflecting an image to a user's eyes to indirectly view objects comprising:
    a central support;
    a viewing member attached to an upper end of the central support, having a main body with an open end and an interior mirror located within the main body;
    an eye aperture formed in the main body of the viewing member adjacent the interior mirror;
    a reflecting member mounted to an adjustment member and positioned in spaced alignment to the viewing member, the reflecting member including an exterior mirror positioned in spaced alignment to the interior mirror, wherein the exterior mirror is arranged to reflect an image from the exterior mirror to the interior mirror, and then to the user's eye;
    the adjustment member attached to the central support to hold the reflecting member in spaced alignment to viewing member, and to allow the reflecting member to be adjusted with respect to the viewing member; and
    wherein the adjustment member includes a support arm that extend laterally from the central support terminating in a vertically oriented sleeve, and wherein a vertical post extends from a bottom edge of the exterior mirror and is rotatably received within the sleeve.

14. The device of claim 13, wherein the interior mirror is angled at about 45° relative to the user's eye.

15. The device of claim 13, wherein the adjustment member includes a support arm that extends laterally from the central support, and wherein support arm is hingedly connected to the central support to allow the support arm to be folded down.

16. The device of claim 13, wherein lights are provided adjacent exterior mirror to increase the intensity of the image reflected by the exterior mirror.

17. The device of claim 13, further comprising a rear mirror positioned in spaced alignment to the reflecting member behind the user, wherein the reflecting member is oriented and arranged to reflect an image of the user's rear from the rear mirror while the user is looking ahead into the viewing member.

* * * * *